Dec. 27, 1960 J. S. ATTINELLO Re. 24,917

AIRCRAFT HIGH LIFT SUPERCIRCULATION SYSTEM USING SUPERSONIC BLOWING

Original Filed Feb. 10, 1954 2 Sheets-Sheet 1

John S. Attinello INVENTOR

BY Walter S. Pawl ATTORNEYS

INVENTOR
John S. Attinello
BY
Walter S. Paul
ATTORNEYS

United States Patent Office

Re. 24,917
Reissued Dec. 27, 1960

24,917

AIRCRAFT HIGH LIFT SUPERCIRCULATION SYSTEM USING SUPERSONIC BLOWING

John S. Attinello, Greencastle, Pa.

Original No. 2,868,480, dated Jan. 13, 1959, Ser. No. 409,545, Feb. 10, 1954. Application for reissue Jan. 7, 1960, Ser. No. 1,145

5 Claims. (Cl. 244—42)

(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States of America for government purposes without the payment of any royalties thereon or therefor.

This invention relates to a super-circulation system for airplanes, and the term is used to differentiate systems which materially effect the circulation about an airfoil from those which stabilize or remove boundary layer.

High lift device of many types are well known and used in present day aircraft. The majority of them, to be effective, rely on boundary layer control, either by suction or low speed blowing. Others include wing camber and wing area increasing means, each of which provides an increase in maximum lift coefficient, but unfortunately, also provides accompanying insurmountable difficulties, especially for high speed aircraft. To my knowledge, there is no high lift device or method capable of appreciably advancing the maximum lift coefficient by superimposing additional circulation strength on the flow field about the airfoil by means of a *sonic or* supersonic jet. In an airfoil which behaves in accordance with the Kutta-Joukowsky law (Lift is equal to the product of Fluid Density, stream Velocity and Circulation), the present invention has for its object to increase circulation by means of a *sonic or* supersonic jet thereby increasing lift, while maintaining constant or even decreasing the angle of attack. In terms of the flow field about the airfoil, an object of the invention is to increase the maximum lift coefficient by injecting a stream of expanding *sonic or* supersonic velocity fluid in the region of separation above the airfoil, which stream acts as a pump on the airstream above the airfoil, that is it energizes the air and draws it smoothly over the wing upper surface. The flow pattern resulting from the fluid injection has the stagnation point lowered, the upper streamlines closer together and adhering to the airfoil and the lower streamlines more widely spaced, a picture of greater circulation strength.

It is a critical feature that the stream of injected air be of a speed [in the order] of at least Mach 1 at the nozzle, and the successful use of such an airstream is unexpected. The theory propounded by the aerodynamic science predicts complete failure of the invention, it being the popular belief that the resulting shock waves of the *sonic or* supersonic jet in the region of the boundary layer would cause separation of the flow at the very least. Numerous NACA reports on the interaction of shock waves with the boundary layer were evidence of this possibility. One of the world's recognized authorities on the theory of boundary layer phenomenon was also of a similar opinion. The following is a translation from Dr. H. Schlichting's book, "Grenzschicht Theorie" (Boundary Layer Theory), published by G. Braun, Karlsruhe. Copyrighted 1951, page 213. "Another possibility to avoid separation is to add new energy to the decelerated fluid particles in the boundary layer. This can be done either through the injection of fluids out of the interior of the body using a special blower, or by taking the energy directly from the main flow (leading edge slot) by adding through a slot from the high pressure area, fluid to the decelerated boundary layer. In both cases the velocity in the layer close to the wall is increased through the addition of energy in such a way removing the danger of separation. Blowing according to the former case is, however, in the practical construction not very important with regard to the gain. To keep the amount of energy small, the width of the ejected jet must be kept small. The jet, however, dissolves shortly after its exit into vortices. Also, in the case of such blowing, the laminar boundary layer is always made turbulent which is undesirable for modern airfoil sections with very small drag. The blowing is a measure to avoid the separation and decrease of drag has for this reason little chance of practical application." The instant invention contravenes this, and the results obtained by the invention are exceedingly good, as will appear herein more fully. Accordingly, another object of the invention is to increase circulation about an airfoil by injecting a stream of expanding and accelerating fluid into the flow field on the upper surface of the wing or in the wake caused by normal separation near the airfoil flap leading edge, the expanding and accelerating fluid functioning in the nature of a jet pump, both supplying fluid flow over the airfoil and drawing the proximate fluid of the flow field over the airfoil in greater strength as would be evidenced by closer streamlines.

A more specific object of the invention is to provide means to increase airfoil lift in the form of a spanwise nozzle in the airfoil fitted to a source of fluid under sufficient pressure that the stream discharged is [in the order of] *at least* Mach one with the result that the discharging, expanding and velocity increasing stream attracts the upper flow field of the airfoil and becomes intimately, inseparably associated with it at the same time imparting energy thereto for increasing circulation about the airfoil. It is noted here that the fluid must be discharged at at least Mach one, otherwise the fluid will decelerate and compress slightly, upon emission, rather than accelerate and rarefy.

In many developments of a scientific nature practicability is an absent quality. Here, however, an aim of the invention is to increase lift at small angles of attack by mechanically simplified means and without the usually suffered losses in throttling. There are no moving parts in the invention form illustrated, and throttling for any reason is unnecessary. Moreover, with supersonic discharge toward and over the aft of the wing and the control surfaces thereof, circulation is increased to the point where an equivalent increase by subsonic blowing would require ducting containing the volume of the entire wing. Calculations and tests have shown that a low pressure system would require in the order of fifty times the volume needed by the invention to obtain the same or equivalent results.

The omission of vanes or other flow directing and throttling devices has been mentioned. The use of such expedients has been found necessary to obtain uniform flow distribution from root to tip ends of subsonic blowing systems. Obviously, vanes and other directing and/or throttling devices detract from the efficiency of the system. By operating the present invention system at at least Mach one, there is an approximately constant spanwise lift coefficient which results, making it wholly unnecessary to resort to any vanes or the like.

Other objects and features of importance will become apparent in following the description of the illustrated forms of the invention, wherein.

Figure 1:
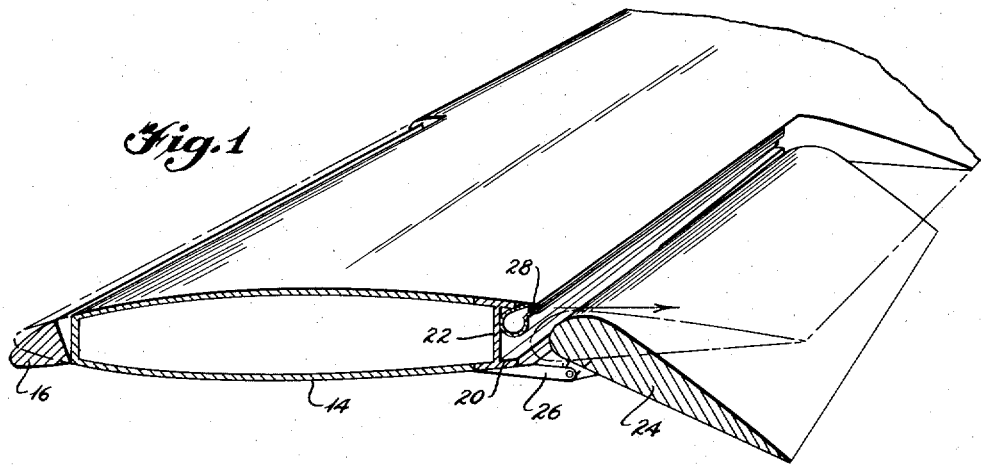
Fig. 1 is a fragmentary perspective view of a schematically illustrated wing with an embodiment of the invention applied thereto, including a duct located behind the main spar of the wing.
Figure 2:
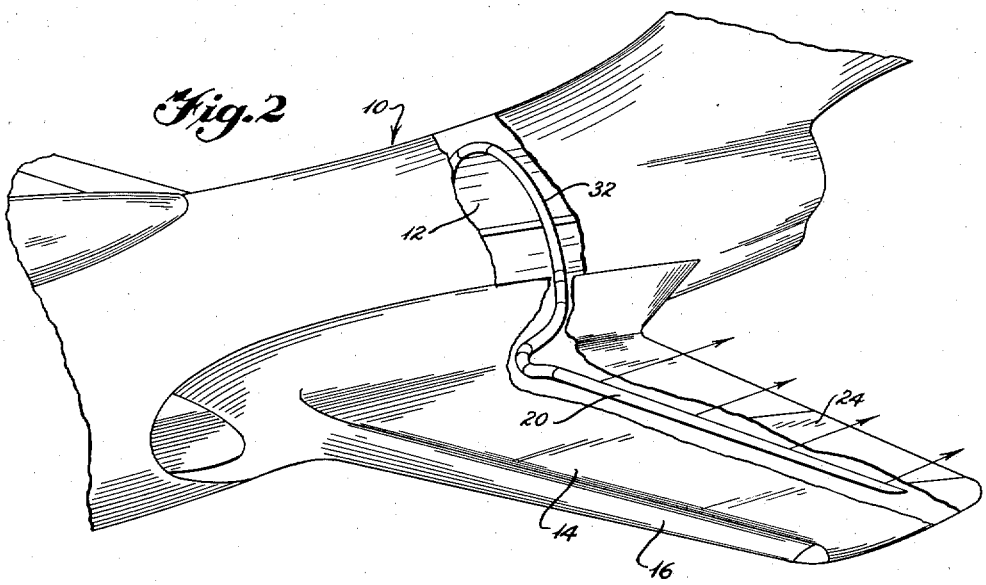
Fig. 2 is a fragmentary perspective view of an aircraft showing primarily a bled fluid collector on the engine, the collector being arranged to obtain bled fluid from the engine for subsequent emission through the airfoil duct.

The invention, although useful with various aircraft, has particular application on high speed airplanes of present day design. Accordingly, the airplane 10 is one of the jet propelled military craft having a gas reaction engine 12 and low drag wings 14 with a droop nose 16. The droop nose is not an essential feature of the invention, its inclusion merely indicating that the presence of the invention does not automatically exclude the various known high lift devices.

The illustrated embodiment of the invention includes a spanwise duct 20 located aft of the wing rear spar 22 and in advance of a control surface such as aileron 24, the latter being of usual configuration and mounted by hinges 26. This duct location has been shown, although other locations may be selected such as, in the aileron, in advance of the spar 22 or any other location considered practical. The nozzle 28 of duct 20 also extends in a spanwise direction and is directed downstream over the upper surface of aileron 24. The function of duct 20 is to conduct fluid to the nozzle 28, the latter directing it over the airfoil and/or control surface 24.

Although several possibilities exist in the selection of a motor for driving the fluid through duct 20, the use of fluid bled from engine 12 provides the best solution to the motor problem for several reasons. The added weight to the aircraft is small compared to systems having separate motors. It is essential to the operativeness of the invention that the fluid discharged from the duct be at least Mach 1 [or close to it], and fluid bled from the engine 12 obtains that order of velocity. Such fluid may be extracted from any part of the engine, such as the turbine, compressor or tail pipe, making it conveniently usable. As illustrated, collector ring 32 on engine 12 taps the engine fluid and being connected to duct 20, one for each semi-span, feeds fluid under pressure to the latter.

Figure 3:
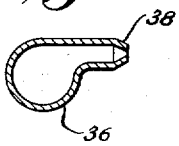
Fig. 3 is an enlarged transverse sectional view of one form of wing duct, noting the convergent discharge nozzle.
Figure 4:
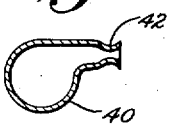
Fig. 4 is a sectional view of a modified duct nozzle.

Nozzle configuration may be varied, as shown in Figs. 3 and 4. The duct 36 of Fig. 3 is provided with a converging nozzle 38, while duct 40 has a converging-diverging nozzle 42. The former is preferred because it is not so critical as the latter, that is, it would permit more efficient blowing over a range of speeds than would nozzle 42 which is poorly efficient at off-design speeds. Moreover, nozzle 38—or a series of holes—makes it possible to maintain the necessary pressure head throughout the long span of duct 20 or the alternative ducts 36 and 40.

OPERATION AND METHOD

Figure 7:
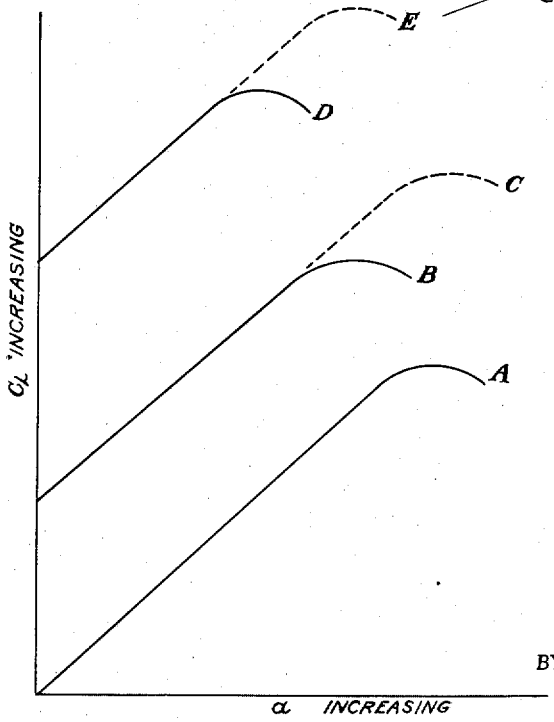
Fig. 7 is a graph illustrating the effects of mere boundary layer control and super circulation on the lifting characteristics of a wing.

Attention is first invited to Fig. 7 which graphically illustrates the results that are obtained by use of the invention, as compared to conventional high lift devices.

Lift coefficient is plotted against angle of attack and curve A represents the behavior of an airfoil selected to be the norm of comparison and having no high lift devices. Curve B shows the same airfoil with flaps, while curve C indicates the gain with leading edge boundary layer control. Curve D indicates the same airfoil with the super circulation invention applied, while curve E indicates the large increase in lift coefficient when the invention is combined with leading edge boundary layer control. Fig. 7 graphically portrays, by a comparison, the large gain in lift coefficient at a constant angle of attack of the super circulation system, and shows that the gain may be added to that obtained by conventional high lift devices.

The method used to obtain these results comprises the establishing of an expected flow pattern about an airfoil, and injecting a *sonic or* supersonic stream into the flow field on the upper surface of the wing in advance of the trailing edge. More explicitly, the steps are injecting a fluid stream such that upon discharge the fluid expands and accelerates in region above the airfoil performing in the nature of a jet pump as it issues in the general downstream direction. The action on the adjacent air and the entire flow field is beneficial, since the discharging stream reacts on the flow field to energize the air above the airfoil and draw it over the airfoil in a more ideal manner.

Considering the Kutta-Joukowsky law, it is circulation that is changed and appreciably so, rather than the other factors. Additional field strength is applied to the flow field, something which is not obtained in such large degree (see Fig. 7) by known high lift devices nor subsonic blowing.

Figure 5:
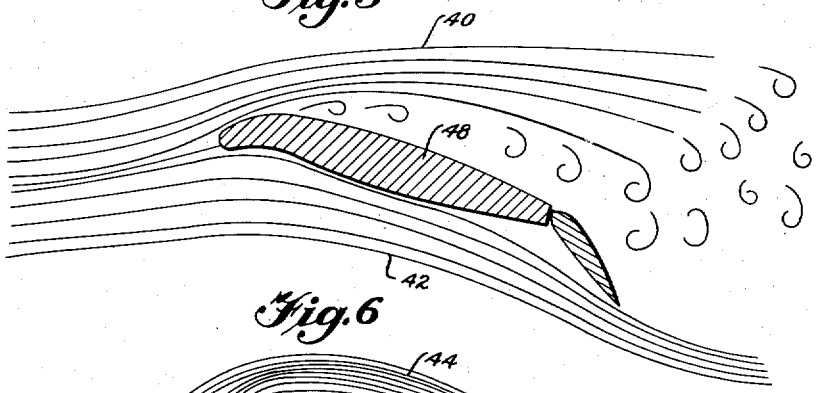
Fig. 5 is an illustration of a wing with its streamlines at one angle of attack and at a certain airspeed.
Figure 6:
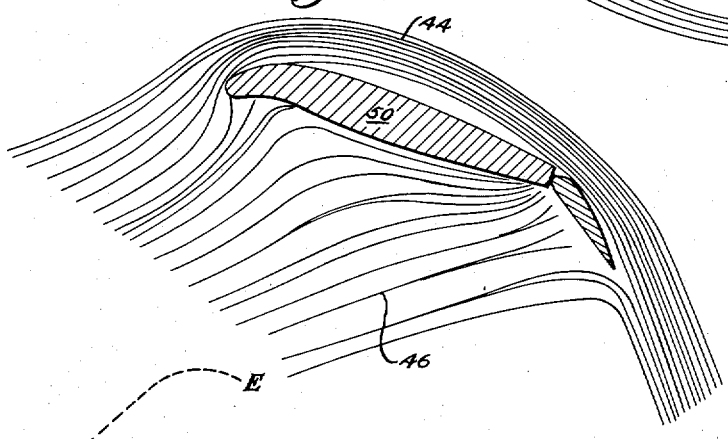
Fig. 6 is an illustration of the same wing as in Fig. 5 at the same angle of attack and airspeed, but with supercirculation applied as evidenced by the far more favorable array of streamlines.

The operation of the structural embodiment illustrated in the drawing is as follows: Air or other fluid under a pressure sufficient to discharge it at [about] *at least* Mach 1 is forced through the duct nozzles and over the airfoil upper surface, the point of discharge being between the leading and trailing edge. Upon emission, the flow field which would ordinarily be as depicted in Fig. 5, is changed to a far better flow field, as in Fig. 6. Inspection of the streamlines 40 and 42 shows that there is little circulation, while examination of streamlines 44 and 46 indicates a circulation increase. Streamlines 40 are spaced far apart compared to streamlines 44 and the inverse is true of streamline comparison between those indicated at 42 and 46. Figs. 5 and 6 are intended to show the airfoils 48 and 50 at the same attitude, as was the case when tested to yield the illustrated results. Thus, the alteration of flow pattern is attributable entirely to the action of the *sonic or* supersonic, expanding and accelerating stream issued from the duct in the airfoil on the airflow flow field.

On a given aircraft, the supercirculation system described may be used at all times during flight or at selected times by operation of a valve in the line which feeds the duct. This and other departures in the mode of operation or structural variations may be made without departing from the scope of the following [claim] *claims*.

What is claimed is:

*1*. In the method of increasing circulation about an airfoil while maintaining the angle of attack constant, when the airfoil in flight behaves in accordance with the Kutta-Joukowsky law, *the airfoil being of a kind that is capable of having a greater rate of change of camber in certain chordal regions than in other such regions*, the steps of establishing a flow field about the airfoil and injecting a stream of expanding and accelerating fluid into the flow field *in a region including a region of relatively great rate of change in camber and regions adjacent thereto* above substantially the entire span of the airfoil in the direction of the flow and adjacent the upper surface of the airfoil at a velocity of at least Mach one to attract the flow in proximity to the injected stream and at the same time provide additional flow over the aft portion of the airfoil, the injecting of fluid in a downstream direction being executed over the upper airfoil surface only.

*2. In the method of increasing circulation about an airfoil while maintaining the angle of attack constant, when the airfoil in flight behaves in accordance with the Kutta-Joukowsky law, the airfoil being of a kind that is capable of having a greater rate of change of camber in certain chordal regions than in other such regions, the steps of establishing a flow field about the airfoil and injecting a stream of expanding and accelerating fluid into the flow field in a region including a region of relatively great rate of change in camber and regions adjacent thereto above at least a portion of the span of the airfoil in the direction of the flow and adjacent the upper surface of the airfoil at a velocity of at least Mach one to attract the flow in proximity to the injected stream and at the same time provide additional flow over the aft portion of the airfoil, the injecting of fluid in a downstream direction being executed over the upper airfoil surface only.*

*3. In the method of increasing circulation about an airfoil having a flap while maintaining the angle of attack constant, when the airfoil in flight behaves in accordance with the Kutta-Joukowsky law, the steps of establishing a flow field about the airfoil and injecting a stream of expanding and accelerating fluid into the flow field in the region of separation near the airfoil flap leading edge above the airfoil in the direction of the flow and adjacent the upper surface of the airfoil at a velocity of at least Mach one to attract the flow in proximity to the injected stream and at the same time provide additional flow over the aft portion of the airfoil, the injecting of fluid in a downstream direction being executed over the upper airfoil surface only.*

*4. In the method of increasing circulation about an airfoil having a trailing edge control surface while maintaining the angle of attack constant, when the airfoil in flight behaves in accordance with the Kutta-Joukowsky law, the steps of establishing a flow field about the airfoil and injecting a stream of expanding and accelerating fluid into the flow field in the region of separation in advance of said control surface above the airfoil in the direction of the flow and adjacent the upper surface of the airfoil at a velocity of at least Mach one to attract the flow in proximity to the injected stream and at the same time provide additional flow over the aft portion of the airfoil, the injecting of fluid in a downstream direction being executed over the upper airfoil surface only.*

*5. In the method of increasing circulation about an airfoil while maintaining the angle of attack constant, when the airfoil in flight behaves in accordance with the Kutta-Joukowsky law, the airfoil being of a kind that is capable of having a greater rate of change of camber in certain chordal regions than in other such regions, the steps of establishing a flow field about the airfoil and injecting a stream of expanding and accelerating fluid into the flow fluid in a region including a region of relatively great rate of change in camber and regions adjacent thereto above the span of the airfoil in the direction of the flow and adjacent the upper surface of the airfoil at a velocity of at least Mach one to attract the flow in proximity to the injected stream and at the same time provide additional flow over the aft portion of the airfoil, the injecting of fluid in a downstream direction being executed over the upper airfoil surface only.*

References Cited in the file of this patent or the original patent

UNITED STATES PATENTS

| | | |
|---|---|---|
| 2,568,813 | Lundberg | Sept. 25, 1951 |
| 2,585,676 | Poisson-Quinton | Feb. 12, 1952 |

FOREIGN PATENTS

| | | |
|---|---|---|
| 955,762 | France | Feb. 4, 1949 |

OTHER REFERENCES

Aero Digest (magazine), April 1, 1945, pages 98, 99, 170.